(12) United States Patent
Jackson

(10) Patent No.: US 7,503,969 B2
(45) Date of Patent: Mar. 17, 2009

(54) INKJET INK

(75) Inventor: Christian Jackson, Wilmington, DE (US)

(73) Assignee: E.I. du Pont de Nemours & Company, Wilmington, DE (US)

( * ) Notice: Subject to any disclaimer, the term of this patent is extended or adjusted under 35 U.S.C. 154(b) by 0 days.

(21) Appl. No.: 11/974,253

(22) Filed: Oct. 11, 2007

(65) Prior Publication Data

US 2008/0087194 A1 Apr. 17, 2008

Related U.S. Application Data

(60) Provisional application No. 60/851,232, filed on Oct. 12, 2006.

(51) Int. Cl.
*C09D 11/02* (2006.01)

(52) U.S. Cl. .................. 106/31.75; 106/31.86

(58) Field of Classification Search ............. 106/31.75, 106/31.86
See application file for complete search history.

(56) References Cited

U.S. PATENT DOCUMENTS

| | | | | |
|---|---|---|---|---|
| 5,213,613 A | * | 5/1993 | Nagashima et al. | 106/31.75 |
| 5,580,373 A | * | 12/1996 | Lane et al. | 106/31.43 |
| 5,985,968 A | * | 11/1999 | Lassila et al. | 524/211 |
| 6,069,190 A | | 5/2000 | Bates et al. | |
| 6,153,001 A | * | 11/2000 | Suzuki et al. | 106/31.75 |
| 6,786,957 B2 | | 9/2004 | Choy et al. | |
| 7,303,272 B2 | * | 12/2007 | Taguchi et al. | 347/100 |
| 7,311,393 B2 | * | 12/2007 | Taguchi et al. | 347/100 |
| 7,396,398 B2 | * | 7/2008 | Lee et al. | 106/31.75 |
| 2005/0098063 A1 | * | 5/2005 | Lee et al. | 106/31.75 |
| 2006/0117994 A1 | * | 6/2006 | Ryu et al. | 106/31.86 |
| 2006/0169171 A1 | * | 8/2006 | Lee et al. | 106/31.75 |
| 2006/0254459 A1 | * | 11/2006 | Mori et al. | 106/31.75 |
| 2007/0040881 A1 | * | 2/2007 | Ham et al. | 106/31.75 |
| 2008/0060547 A1 | * | 3/2008 | Jackson | 106/31.13 |
| 2008/0060548 A1 | * | 3/2008 | Jackson | 106/31.13 |

FOREIGN PATENT DOCUMENTS

JP 56088473 A * 7/1981

OTHER PUBLICATIONS

English translation of JP05/086314, Apr. 1993.*

* cited by examiner

*Primary Examiner*—Helene Klemanski

(57) ABSTRACT

The present invention pertains to an inkjet ink with a self-dispersing pigment colorant and an aqueous vehicle comprising (a) 1,3-dimethyl urea and/or 1,1,3,3-tetramethyl urea and (b) diethylene glycol and/or triethylene glycol. The ink exhibits good print reliability and excellent latency.

10 Claims, No Drawings

INKJET INK

CROSS-REFERENCE TO RELATED APPLICATION

This application claims priority under 35 U.S.C. §119 from U.S. Provisional Application Ser. No. 60/851,232 (filed Oct. 12, 2006), the disclosure of which is incorporated by reference herein for all purposes as if fully set forth.

BACKGROUND OF THE INVENTION

The present invention pertains to inkjet ink and more particularly to an inkjet ink comprising self dispersing pigment and a certain aqueous vehicle which provides long latency.

inkjet printing is a non-impact printing process in which droplets of ink are deposited on a substrate, such as paper, to form the desired image. The droplets are ejected from a printhead in response to electrical signals generated by a microprocessor. Inkjet printers offer low cost, high quality printing and have become a popular alternative to other types of printers.

An ink-jet ink is characterized by a number of necessary properties, including color, jettability, decap time (latency), drying time and shelf-life, among others. There is, however, often a tradeoff between these properties because improving one property can result in the deterioration of another property.

The decap time of the ink is the amount of time a printhead can be left uncapped and idle and still fire a drop properly—that is to say without misdirection, loss of color or unacceptable decrease of velocity. Decap is sometimes referred to in the art as "latency" and these two terms will be used interchangeably.

Because not all the nozzles of the printhead print all the time, a printer service routine requires the idle nozzles to discharge ("spit") on a regular basis into the waste container ("spittoon") to avoid printing defects. It is desirable, however, to service the printhead as infrequently as possible as it is wasteful of ink and slows print speeds. To reduce need for servicing, an ink will preferably have a long decap time.

Contributing to decap problems is the trend for printheads to fire smaller drops to increase image resolution. The increased surface area to volume to the smaller drops allows faster evaporation of volatile vehicle components at the nozzle face and thereby tends to decrease decap time.

Both dyes and pigments have been used as colorants for inkjet inks and both have certain advantages. Pigment inks are advantageous because they tend to provide more water-fast and light-fast images than dye inks. Also, with regard to black inks, carbon black pigment can provide much higher optical density than any available dye colorant.

Pigments, in order to be used in inks, must be stabilized to dispersion in the ink vehicle. Stabilization of the pigment can be accomplished by use of separate dispersing agents, such as polymeric dispersants or surfactants. Alternatively, a pigment surface can be modified to chemically attach dispersibility-imparting groups and thereby form a so-called "self-dispersible" or "self-dispersing" pigment (hereafter "SDP(s)") which is stable to dispersion without separate dispersant.

SDPs are often advantageous over traditional dispersant-stabilized pigments from the standpoint of greater stability and lower viscosity at the same pigment loading. This can provide greater formulation latitude in final ink.

Various inkjet ink formulations comprising SDP have been disclosed in the art. For example, U.S. Pat. No. 6,153,001 discloses an aqueous SDP ink comprising diethylene glycol and urea and an aqueous SDP ink comprising propylene glycol and ethylene urea. U.S. Patent Publication 2005/0098063 discloses aqueous SDP inks comprising trimethylene urea or 1,3-dimethyl urea humectant. U.S. Pat. No. 6,069,190 discloses an aqueous inkjet ink with improved latency comprising 2-pyrrolidone humectant and a combination of SDP and anionic dye colorant. U.S. Pat. No. 6,786,957 discloses aqueous inkjet inks comprising colorant, which can be a dye, pigment or macromolecular chromophore, and an aprotic polar solvent which can be tetramethyl urea.

Although current SDP ink compositions are being successfully jetted, there is still a need in the art for, and it is an object of this invention to provide, inks with longer decap times that still retain other beneficial print properties.

SUMMARY OF THE INVENTION in accord with an objective of this invention, it was found that an aqueous inkjet ink comprising SDP in combination with a particular set of humectants can provide surprisingly long latency.

Thus, the present invention pertains to an ink-jet ink comprising an aqueous vehicle, and a self-dispersing pigment colorant wherein the vehicle comprises a first humectant selected from the group of 1,1,3,3-tetramethyl urea, 1,3-dimethyl urea and any combination thereof and a second humectant selected from the group consisting of diethylene glycol, triethylene glycol and any combination thereof.

in a preferred embodiment, the first humectant is present in the ink at levels of at least 2% by weight based on the total weight of ink. Also, preferably, the weight ratio of second humectant to first humectant present in the ink is equal to or greater than 0.7.

DETAILED DESCRIPTION OF THE PREFERRED EMBODIMENTS

Aqueous Vehicle

The ink vehicle is the liquid carrier (or medium) for the colorant(s) and optional additives. The term "aqueous vehicle" refers to a vehicle comprised of water and one or more organic, water-soluble vehicle components commonly referred to as co-solvents or humectants. Sometimes in the art, when a co-solvent can assist in the penetration and drying of an ink on a printed substrate, it is referred to as a penetrant.

According to the present invention, the aqueous vehicle comprises at least two humectants, a first humectant selected from the group consisting of tetramethyl urea and 1,3-dimethyl urea and any combination thereof, and a second humectant selected from the group consisting of diethylene glycol, triethylene glycol and any combination thereof.

Written as a formula, tetramethyl urea is $(CH_3)_2NCON(CH_3)_2$ and 1,3-dimethyl urea is $(CH_3)NHCONH(CH_3)$. Minimum levels of first humeotant are in the range of 2 to 3 percent by weight (wt %) based on the total weight of ink, and preferably the first humectant is present in an amount of 3-15 weight % based on the total weight of ink. In a preferred embodiment, the weight ratio of second humectant to first humectant present in the ink is equal to or greater than 0.7. The cummulative total of first and second humectant has no upper limit parse, but will generally be less than 40 weight % and typically less than 35 weight % of the total weight of ink. An example ink formulation comprising a cummulative first and second humectant total of 30 weight % is shown herein after to provide advantageous results.

The inventive inks may further comprise additional water-soluble co-solvent(s) /humectant(s) such as, for example, alcohols, ketones, keto-alcohols, ethers, sulfones, sulfoxides, lactones and lactams; glycerol and derivatives thereof; glycols such as ethylene glycol, and tetraethylene glycol, propylene glycol, di- and tri-propylene glycol, trimethylene glycol, butylene glycol, hexylene glycol and thiodiglycol; addition polymers of oxyethylene or oxypropylene such as polyethylene glycol, polypropylene glycol and the like; mono- and di-alkyl ($C_1$-$C_4$) ethers of mono-, di- and tri-ethylene glycol and mono-, di- and tri-propylene glycols; linear or branched $C_4$-$C_8$ diols and triols.

An aqueous vehicle will typically contain about 50% to about 96% water with the balance (i.e., about 50% to about 4%) being the water-soluble solvent/humectant.

Colorant

Pigment colorants, by definition, are substantially insoluble in an ink vehicle and must be dispersed. The inks in accordance with the present invention contain a self-dispersing pigment ("SDP(s)"). SDPs are pigments whose surface has been modified with dispersibility-imparting groups to allow stable dispersions to be achieved without the use of a separate dispersant (such as a polymeric dispersant). For dispersion in an aqueous vehicle, the SDPs are surface-modified pigments in which one or more hydrophilic groups are attached to the pigment surface. Most typically, the hydrophilic groups are ionizable hydrophilic groups.

The SDPs may be prepared by grafting a functional group or a molecule containing a functional group onto the surface of the pigment, by physical treatment (such as vacuum plasma), or by chemical treatment (for example, oxidation with ozone, hypochlorous acid or the like). A single type or a plurality of types of hydrophilic functional groups may be bonded to one pigment particle.

Most commonly, the ionizable hydrophilic groups are anionic moieties, particularly carboxylate and/or sulfonate groups, which provide the SDP with a negative charge when dispersed in aqueous vehicle. The anionic groups are usually associated with an alkali metal, alkaline earth or amine counterions.

Self-dispersing pigments are described, for example, in the following U.S. Pat. Nos. 5,571,311; 5,609,671; 5,968,243; 5,928,419; 6,323,257; 5,554,739; 5,672,198; 5,698,016; 5,718,746; 5,749,950; 5,803,959; 5,837,045; 5,846,307; 5,895,522; 5,922,118; 6,123,759; 6,221,142; 6,221,143; 6,281,267; 6,329,446; 6,332,919; 6,375,317; 6,287,374; 6,398,858; 6,402,825; 6,468,342; 6,503,311; 6,506,245 and 6,852,156.

Commercial sources of SDPs suitable for use in inkjet applications include Cabot Corporation (Billerica, Mass. USA), Toyo ink USA LLC (Addison, Ill. USA), Orient Corporation of America (Kenilworth, N.J. USA) and E. I. du Pont de Nemours and Company (Wilmington, Del. USA).

Examples of pigments with coloristic properties useful in inkjet inks include: (cyan) Pigment Blue 15:3 and Pigment Blue 15:4; (magenta) Pigment Red 122 and Pigment Red 202; (yellow) Pigment Yellow 14, Pigment Yellow 74, Pigment Yellow 95, Pigment Yellow 110, Pigment Yellow 114, Pigment Yellow 128 and Pigment Yellow 155; (red) Pigment Orange 5, Pigment Orange 34, Pigment Orange 43, Pigment Orange 62, Pigment Red 17, Pigment Red 49:2, Pigment Red 112, Pigment Red 149, Pigment Red 177, Pigment Red 178, Pigment Red 188, Pigment Red 255 and Pigment Red 264; (green) Pigment Green 1, Pigment Green 2, Pigment Green 7 and Pigment Green 36; (blue) Pigment Blue 60, Pigment Violet 3, Pigment Violet 19, Pigment Violet 23, Pigment Violet 32, Pigment Violet 36 and Pigment Violet 38; and (black) carbon black. However, some of these pigments may be not be suitable for preparation as SDP, and choice of colorant may be dictated by compatibility with a given surface treatment method. Colorants are referred to herein by their "C.I." designation established by Society Dyers and Colourists, Bradford, Yorkshire, UK and published in *The Color Index*, Third Edition, 1971.

in one preferred embodiment, the hydrophilic functional groups on the SDP surface are primarily carboxyl groups, or a combination of carboxyl and hydroxyl groups; even more preferably the hydrophilic functional groups on the SDP are directly attached and are primarily carboxyl groups, or a combination of carboxyl and hydroxyl.

Preferred pigments in which the hydrophilic functional group(s) are directly attached may be produced, for example, by an oxidation method such as that described in previously referenced U.S. Pat. No. 6,852,156. Carbon black treated by the method described in this reference has a high surface-active hydrogen content which is neutralized with base to provide very stable dispersions in water. Application of this method to colored pigments is also possible.

The amount of surface treatment (degree of functionalization) can vary. For pigments modified with carboxyl surface groups, advantageous (higher) optical density can be achieved when the degree of functionalization (the amount of carboxylic acid groups present on the surface of the SDP per unit surface area) is less than about 3.5 micromoles per square meter of pigment surface (3.5 $\mu mol/m^2$) and more preferably less than about 3.0 $\mu mol/m^2$. Functionalization of less than about 1.8 $mmol/m^2$, and even less than about 1.5 $\mu mol/m^2$, is also suitable and may be preferred for some SDP. As described in U.S. Pat. No. 6,852,156, the amount of carboxyl functionalization can be determined from the amount of alkali or amine, required to neutralize a unit weight of pigment. The value is converted to acid (carboxyl) per square meter from the pigment's surface area (in $m^2$) per unit weight.

The levels of SDP employed in formulated inks are those levels needed to impart the desired optical density to the printed image. Typically, SDP levels are in the range of about 0.01 wt % to about 10 wt %, and more typically from about 1 wt % to about 9 wt %.

Other Ingredients (Additives)

Other ingredients, additives, may be formulated into the inkjet ink, to the extent that such other ingredients do not interfere with the stability and jetablity of the ink, which may be readily determined by routine experimentation. Such other ingredients are in a general sense well known in the art.

Commonly, surfactants are added to the ink to adjust surface tension and wetting properties. Suitable surfactants include ethoxylated acetylene diols (e.g. Surfynols® series from Air Products), ethoxylated primary (e.g. Neodol® series from Shell) and secondary (e.g. Tergtol® series from Union Carbide) alcohols, sulfosuccinates (e.g. Aerosol® series from Cytec), organosilicones (e.g. Silwet® series from Witco) and fluoro surfactants (e.g. Zonyl® series from DuPont). Surfactants are typically used in amounts up to about 5 wt % and more typically in amounts of no more than 2 wt %. In a preferred embodiment of the present invention, surfactant is present in an amount of between about 0.01 wt % and 0.5 wt %.

Polymers may be added to the ink to improve durability. The polymers can be soluble in the vehicle or dispersed (e.g. "emulsion polymer" or "latex"), and can be ionic or nonionic. Useful classes of polymers include acrylics, styrene-acrylics and polyurethanes.

Biocides may be used to inhibit growth of microorganisms.

Inclusion of sequestering (or chelating) agents such as ethylenediaminetetraacetic acid (EDTA), iminodiacetic acid (IDA), ethylenediamine-di(o-hydroxyphenylacetic acid) (EDDHA), nitrilotriacetic acid (NTA), dihydroxyethylglycine (DHEG), trans-1,2-cyclohexanediaminetetraacetic acid (CyDTA), dethylenetriamine-N,N,N',N'',N''-pentaacetic acid (DTPA), and glycoletherdiamine-N,N,N',N'-tetraacetic acid (GEDTA), and salts thereof, may be advantageous, for example, to eliminate deleterious effects of heavy metal impurities.

Ink Properties

Jet velocity, separation length of the droplets, drop size and stream stability are greatly affected by the surface tension and the viscosity of the ink. Pigmented ink jet inks typically have a surface tension in the range of about 20 $mN·m^{-1}$ to about 70 $mN·m^{-1}$ at 25° C. Viscosity can be as high as 30 mPa·s at 25° C., but is typically somewhat lower. The ink has physical properties compatible with a wide range of ejecting conditions, materials construction and the shape and size of the nozzle. The inks should have excellent storage stability for long periods so as not clog to a significant extent in an ink jet apparatus. Further, the ink should not corrode parts of the ink jet printing device it comes in contact with, and it should be essentially odorless and non-toxic.

Although not restricted to any particular viscosity range or printhead, the inventive ink is particularly suited to lower viscosity applications. Thus the viscosity (at 25° C.) of the inventive inks can be less than about 7 mPa·s, or less than about 5 mPa·s, and even, advantageously, less than about 3.5 mPa·s. Thermal inkjet actuators rely on instantaneous heating/bubble formation to eject ink drops and this mechanism of drop formation generally requires inks of lower viscosity. As such, the instant inks can be particularly advantages in thermal printheads.

Ink Sets

Inkjet inks are generally used in sets. An ink set comprises at least two differently colored inks, more typically at least three differently colored inks such as cyan, magenta, and yellow (CMY), and more commonly at least four differently colored inks such as cyan, magenta, yellow, and black (CMYK). An ink set may employ one or more inks as described above. The other inks of the ink set are preferably also aqueous inks, and may contain dyes, pigments or combinations thereof as the colorant. Such other inks are, in a general sense, well known to those of ordinary skill in the art.

In a preferred embodiment, at least one of the inks of the ink set is a black ink according to the present invention wherein the self-dispersing pigment is a self-dispersing carbon black pigment.

In addition to the typical CMYK inks, ink sets may further comprise one or more "gamut-expanding" inks, including different colored inks such as an orange ink, a green ink, a red ink and/or a blue ink, and combinations of full strength and light strengths inks such as light cyan and light magenta.

Method of Printing

The inks of the present invention can be printed with any suitable inkjet printer. The substrate can be any suitable substrate including plain paper, such as common electrophotographic copier paper; treated paper, such as photo-quality inkjet paper; textile; and non-porous substrates including polymeric films such as polyvinyl chloride and polyester.

The following examples illustrate the invention without, however, being limited thereto.

EXAMPLES

In the following examples, unless otherwise stated, water was deionized and ingredient amounts are in weight percent of the total weight of ink. Surfynol® 465 is a surfactant from Air Products (Allentown, Pa. USA).

The optical density values reported were measured with a Greytag Macbeth Spectrolino spectrometer and are an average of prints made on three different plain papers (HP office, Xerox 4024 and Hammermill Copy Plus) with a Canon i560 printer. The viscosities are rotational viscometry values at 25° C. measured by a Brookfield viscometer.

Dispersion 1

Carbon black (Nippex 180 from Degussa, surface area 260 $m^2/g$) was oxidized with ozone according to the process described in U.S. Pat. No. 6,852,156. After recovery, a 12.8 weight percent dispersion of self-dispersing carbon black pigment in water was obtained with a viscosity of 3.5 mPa·s (25° C.). The median particle size was about 98 nm. Potassium hydroxide was used to neutralize the treated pigment to a pH of 7. The degree of acid (carboxyl) functionalization was 1.5 micromoles/$m^2$.

The neutralized mixture was purified by ultra-filtration to remove free acids, salts, and contaminants. The purification process was performed to repeatedly wash pigment with deionized water until the conductivity of the mixture leveled off and remained relatively constant.

Dispersion 2

Dispersion 2 was a polymer stabilized carbon black dispersion prepared in a manner similar to example 3 in U.S. Pat. No. 5,519,085 except that the dispersant was a block copolymer with methacrylic acid//benzyl methacrylate//ethyltriethyleneglycol methacrylate (13//15//4). The neutralizing agent was potassium hydroxide. The pigment content was adjusted to be 15% by weight. The dispersant had a number average molecular weight of about 5,000 and weight average molecular weight of about 6,000 g/mol, and was prepared in a manner similar to "preparation 4" described in U.S. Pat. No. 5,519,085, except the monomer levels were adjusted to give the ratio indicated.

Dispersion 3

Dispersion 3 was Cabojet® 300 (a self-dispersing carbon black pigment from Cabot Corporation) dispersed in water at 15 weight percent concentration. The degree of acid functionalization was not reported by the manufacturer.

Latency Test

Latency (Decap time) was determined according to the following procedure using a Hewlett Packard 850 printer that was altered so that the ink cartridge would not be serviced during the test. Just prior to the beginning of the test, the nozzles were primed and a nozzle check pattern was performed to ensure all nozzles were firing acceptably. No further servicing was then conducted During each scan across the page, the pen prints a pattern of 149 vertical lines spaced about ¹⁄₁₆ inch apart. Each vertical line was formed by all nozzles firing one drop, therefore the line is one drop wide and about ½ inch high corresponding to the length of the nozzle array on the printhead. The first vertical line in each scan is the first drop fired from each nozzle after the prescribed latency period, the fifth line was the fifth drop from each nozzle on that scan, and so forth for all 149 lines.

The pattern was repeated at increasingly longer time intervals (decap times) between scans. The standard time intervals between scans was 1, 2, 3, 4, 5, 6, 7, 8, 9, 10, 20, 30, 40, 50, 60, 70, 80, 90 100, 200, 300, 400, 500, 600, 700, 800, 900, and 1000 seconds. Nothing beyond 1000 seconds was attempted.

Upon completion of the test, the $1^{st}$, $5^{th}$, and $32^{nd}$ vertical lines in each scan was examined for consistency, misdirected drop deposits, and clarity of the print. These lines correspond to the 1 st, $5^{th}$ and $32^{nd}$ drops of ink droplets ejected from the nozzle after a prescribed latency period. The decap time was the longest time interval where the particular vertical line can be printed without significant defects.

Preferably, the pen will fire properly on the first drop. However, when the first drop fails to eject properly, the decap time for the fifth and thirty-second drops can provide some information as to the severity of the pluggage and how easily the nozzles can be recovered.

The results tables hereinafter report only the first drop decap time and refer to the value simply as the "Decap Time" in units of seconds.

Nozzle Strength Test

This test provides a simple way to evaluate how well the ink fires from the printhead and how well it primes the printhead nozzles. The inks were filled into HP 45A cartridges and a nozzle check pattern was printed using an HP DeskJet 800 series printer. The nozzle check pattern consists of a short line printed by each individual nozzle in the printhead. The pattern was evaluated for missing or misdirected lines indicating a problem with firing from a particular nozzle. The nozzle check patterns were rated according to the following criteria:

Good–2 or fewer missing or misdirected nozzles
Fair—2 to 5 missing or misdirected nozzles
Poor—More than 5 missing or misdirected nozzles Aqueous Stability of Urea and Urea Derivatives.

Urea and urea derivatives are useful humectants for inkjet formulations. However, many of these materials hydrolyze in aqueous medium, such as an aqueous ink vehicle, causing pH drift and conductivity increases upon extended storage. Such changes can be problematic to the stability and/or jetting performance of the ink and thus greatly limit the useful shelf-life. Of course, it is preferred that formulation components are hydrolytically stable.

To assess hydrolysis stability of urea and urea derivatives, aqueous solutions (10% by weight) were sealed in a vial and placed in an oven for one week at 70° C. The pH and conductivity of each sample before (initial) and after (aged), oven treatment is summarized in the following table.

| Urea derivative | pH | | | Conductivity (mS/cm) | | |
| --- | --- | --- | --- | --- | --- | --- |
| | Initial | Aged | Change | Initial | Aged | Change |
| Urea | 7.43 | 9.42 | 1.99 | 0.04 | 5.96 | 5.92 |
| 1,1-dimethyl urea | 9.79 | 9.87 | 0.08 | 0.13 | 4.27 | 4.14 |
| ethyl urea | 6.28 | 9.30 | 3.02 | 0.11 | 2.29 | 2.18 |
| methyl urea | 6.37 | 9.52 | 3.15 | 0.10 | 1.77 | 1.68 |
| 1,1-diethyl urea | 7.24 | 10.06 | 2.82 | 0.21 | 1.67 | 1.46 |
| butyl urea | 6.91 | 9.51 | 2.60 | 0.03 | 0.95 | 0.92 |
| 1,3-diethyl urea | 8.03 | 10.20 | 2.17 | 0.02 | 0.60 | 0.58 |
| 1,3-dimethyl urea | 7.15 | 9.83 | 2.68 | 0.04 | 0.55 | 0.51 |
| tetramethyl urea | 9.73 | 9.83 | 0.10 | 0.03 | 0.08 | 0.05 |
| trimethylene urea | 9.50 | 9.85 | 0.35 | 0.15 | 0.17 | 0.02 |

The urea solution showed significant change in pH and increase in conductivity due to hydrolysis. Of the urea derivatives tested, 1,1,3,3-tetramethyl urea and trimethylene urea were the most stable, showing no significant change in pH or conductivity under the conditions tested. The next most stable derivatives were 1,3-dimethyl urea and 1,3-diethyl urea which showed only a slight increase in conductivity but significant change in pH.

Stability of SDP in Presence of Urea and Urea Derivatives

Two sets of compositions were made with urea and different urea derivatives using Dispersion 1 and Dispersion 3 (Cabojet® 300) SDP respectively. The formulations are shown below. Median particle size (Initial $D_{50}$) was measured and then the inks were sealed and placed in a 70° C. oven for 7 days after which the particle size was measured again (Final $D_{50}$) and the size increase, as a percentage, was calculated.

| Formulation | Composition A | Composition B |
| --- | --- | --- |
| Dispersion 1 (as % pigment) | 3.5 | — |
| Dispersion 3 (as % pigment) | — | 3.5 |
| Urea or urea derivative (as defined in the Table below) | 8.0 | 10.0 |
| Diethylene glycol | 4.0 | 5.0 |
| 2-pyrrolidone | 8.0 | 5.0 |
| Surfynol 465 | 0.2 | 0.2 |
| Water (to 100%) | Balance | Balance |

| | Composition A | | | Composition B | | |
| --- | --- | --- | --- | --- | --- | --- |
| Urea derivative | Initial $D_{50}$ | Final $D_{50}$ | % Change | Initial $D_{50}$ | Final $D_{50}$ | % Change |
| (no urea or derivative) | 97 | 97 | 0 | 119 | 121 | 2 |
| Urea | 98 | 486 | 396 | 119 | 126 | 4 |
| Methylurea | 97 | 309 | 219 | 119 | 116 | -2 |
| Ethylurea | 101 | 296 | 193 | 119 | 110 | -11 |
| 1,1-dimethyl urea | 100 | 322 | 222 | 119 | 113 | -7 |
| Butylurea | 99 | 319 | 222 | 119 | 123 | 3 |
| 1,1-diethyl urea | 100 | 494 | 394 | 119 | 104 | -13 |
| N,N'-trimethylene urea | 100 | 102 | 2 | — | — | — |
| 1,3-diethyl urea | 100 | 99 | -1 | 119 | 119 | 0 |
| 1,3-dimethyl urea | 98 | 98 | 0 | 119 | 119 | 1 |
| 1,1,3,3-tetramethyl urea | 102 | 96 | -6 | 119 | 121 | 2 |

The results demonstrate the consequences of hydrolytically unstable urea derivatives. The particle size of composition A, with dispersion 1, increases dramatically, and undesirably, as the conductivity increases in the samples with less hydrolytically stability urea derivatives. Composition B, with Cabojet® 300, is more tolerant of higher conductivity environments and is substantially unaffected by the differences in conductivity experienced in this test. However, Inkjet inks made with Cabojet 300 give lower (less desirable) optical density than inkjet inks made with dispersion 1, which is typical of inks with higher salt (conductivity) tolerance.

Example 1

The inks of this example demonstrate 1,1,3,3-tetramethyl urea as the first humectant. Inks (1A-1D) summarized in the following table are comparative inks which lack the required combination of both first and second humectant.

| Ingredients | Ink 1A Comp. | Ink 1B Comp. | Ink 1C Comp. | Ink 1D Comp. |
| --- | --- | --- | --- | --- |
| Dispersion 1 (as % pigment) | 3.5 | 3.5 | 3.5 | 3.5 |
| 1,1,3,3-tetramethyl urea | — | 8.0 | 15.0 | — |
| Diethylene glycol | — | — | — | 8.0 |
| Surfynol 465 | 0.2 | 0.2 | 0.2 | 0.2 |
| Water (to 100%) | Balance | Balance | Balance | Balance |

-continued

|  | Ink 1A Comp. | Ink 1B Comp. | Ink 1C Comp. | Ink 1D Comp. |
|---|---|---|---|---|
| Properties |  |  |  |  |
| Decap Time (seconds) | 5 | 300 | 400 | 300 |
| Nozzle Check | Poor | Good | Good | Weak |
| Optical Density | — | 1.17 | 1.36 | 1.45 |

Inks 1E-1H summarized in the following table demonstrate lower levels of 1,1,3,3-tetramethyl urea. With the most preferred concentrations of first and second humectant, such as Ink 1H, very high decap are achieved. Beneficial effects can still be seen with 1,1,3,3-tetramethyl urea levels as low as about 2% (Ink 1G).

|  | Ink 1E Comp. | Ink 1F | Ink 1G | Ink 1H |
|---|---|---|---|---|
| Ingredients |  |  |  |  |
| Dispersion 1 (as % pigment) | 3.5 | 3.5 | 3.5 | 3.5 |
| 1,1,3,3-tetramethyl urea | 1.0 | 2.0 | 2.0 | 5.0 |
| Diethylene glycol | 10.0 | 10.0 | 14.0 | 10.0 |
| Surfynol 465 | 0.2 | 0.2 | 0.2 | 0.2 |
| Water (to 100%) | Balance | Balance | Balance | Balance |
| Properties |  |  |  |  |
| Decap Time (seconds) | 400 | 400 | 700 | >1000 |
| Nozzle Check | Good | Good | Good | Good |
| Optical Density | 1.34 | 1.35 | 1.35 | 1.36 |

Inks 1I-1L summarized in the following table demonstrate lower levels of diethylene glycol second humectant. At preferred ratios of first and second humectant, such as Ink 1L, very high decap is achieved. As the weight ratio of second humectant/first humectant decreases below about 0.7 (Inks 1K-1I), decap diminishes.

|  | Ink 1I | Ink 1J | Ink 1K | Ink 1L |
|---|---|---|---|---|
| Ingredients |  |  |  |  |
| Dispersion 1 (as % pigment) | 3.5 | 3.5 | 3.5 | 3.5 |
| 1,1,3,3-tetramethyl urea | 8.0 | 8.0 | 8.0 | 8.0 |
| Diethylene glycol | 1.0 | 2.0 | 5.0 | 8.0 |
| Surfynol 465 | 0.2 | 0.2 | 0.2 | 0.2 |
| Water (to 100%) | Balance | Balance | Balance | Balance |
| Properties |  |  |  |  |
| Decap Time (seconds) | 200 | 30 | 300 | >1000 |
| Nozzle Check | Good | Good | Good | Good |
| Optical Density | 1.15 | 1.15 | 1.25 | 1.36 |

The inks summarized in the following table demonstrate triethylene glycol as the second humectant (Ink 1P), relative to comparative Inks 1M-1O with alternate humectant. Although the triethylene glycol is beneficial to decap, diethylene glycol is more effective and in that sense more preferred as the second humectant.

|  | Ink 1M Comp. | Ink 1N Comp. | Ink 1O Comp. | Ink 1P |
|---|---|---|---|---|
| Ingredients |  |  |  |  |
| Dispersion 1 (as % pigment) | 3.5 | 3.5 | 3.5 | 3.5 |
| 1,1,3,3-tetramethyl urea | 8.0 | 5.0 | 5.0 | 5.0 |
| Ethylene glycol | 12.0 | 10.0 | — | — |
| Glycerol | — | — | 10.0 | — |
| Triethylene glycol | — | — | — | 10.0 |
| Surfynol 465 | 0.2 | 0.2 | 0.2 | 0.2 |
| Water (to 100%) | Balance | Balance | Balance | Balance |
| Properties |  |  |  |  |
| Decap Time (seconds) | 500 | 500 | 500 | 700 |
| Nozzle Check | Good | Weak | Good | Good |
| Optical Density | 1.23 | 1.22 | 1.26 | 1.34 |

Inks 1Q-1S, summarized in the following table, are formulated with 2-pyrrolidone, a common humectant in inkjet inks. On its own, 2-pyrrolidone does not seem to help with decap, and in combination with the claimed first and second humectant, seems to actually diminish the effect of the claimed humectant combination (decap of Ink 1R versus Ink 1H). It appears advantageous in these formulations to limit the 2-pyrrolidone, if present at all, to less than 2% or 3% by weight of the total weight of ink.

|  | Ink 1Q Comp. | Ink 1R | Ink 1S |
|---|---|---|---|
| Ingredients |  |  |  |
| Dispersion 1 (as % pigment) | 3.5 | 3.5 | 3.5 |
| 1,1,3,3-tetramethyl urea | 8.0 | 5.0 | 10.0 |
| Diethylene glycol | — | 10.0 | 5.0 |
| 2-pyrrolidone | 2.0 | 3.0 | 5.0 |
| Surfynol 465 | 0.2 | 0.2 | 0.2 |
| Water (to 100%) | Balance | Balance | Balance |
| Properties |  |  |  |
| Decap Time (seconds) | 400 | 400 | 60 |
| Nozzle Check | Good | Good | Good |
| Optical Density | 1.17 | 1.17 | 1.29 |

Inks 1T and 1U, summarized in the following table, demonstrate higher levels of first and second humectant.

|  | Ink 1T | Ink 1U |
|---|---|---|
| Ingredients |  |  |
| Dispersion 1 (as % pigment) | 3.5 | 3.5 |
| 1,1,3,3-tetramethyl urea | 10.0 | 10.0 |
| Diethylene glycol | 10.0 | 20.0 |
| Surfynol 465 | 0.2 | 0.2 |
| Water (to 100%) | Balance | Balance |
| Properties |  |  |
| Decap Time (seconds) | >1000 | >1000 |
| Nozzle Check | Good | Good |
| Optical Density | 1.17 | 1.29 |

Example 2

Inks in this example are formulated with 1,3-dimethyl urea as the first humectant. As summarized in the table below, Ink 2C demonstrates the very high decap achieved with preferred levels of diethylene glycol second humectant. At less preferred levels of diethylene glycol (Ink 2d) or with no second humectant (comparative Inks 2 a and 2B), lower decap is seen. Again, the detrimental effect of 2-pyrrolidone on decap (Ink 2E versus Ink 2C) is seen.

|  | Ink 2A Comp. | Ink 2B Comp. | Ink 2C | Ink 2D | Ink 2E |
| --- | --- | --- | --- | --- | --- |
| Ingredients |  |  |  |  |  |
| Dispersion 1 (as % pigment) | 3.5 | 3.5 | 3.5 | 3.5 | 3.5 |
| 1,3-dimethyl urea | 8.0 | 5.0 | 5.0 | 8.0 | 5.0 |
| Diethylene glycol | — | — | 10.0 | 5.0 | 10.0 |
| 2-pyrrolidone | — | — | — | — | 3.0 |
| Surfynol 465 | 0.2 | 0.2 | 0.2 | 0.2 | 0.2 |
| Water (to 100%) | Balance | Balance | Balance | Balance | Balance |
| Properties |  |  |  |  |  |
| Decap Time (seconds) | 100 | 300 | >1000 | 100 | 100 |
| Nozzle Check | Good | Weak | Good | Weak | Good |
| Optical Density | 1.26 | 1.34 | 1.38 | 1.32 | 1.35 |

The inks summarized in the following table demonstrate triethylene glycol as the second humectant (Ink 2E), relative to comparative Inks 2F-2I with alternate humectant. Triethylene glycol is less effective with 1,3-dimethyl urea, than with the tetramethyl urea (Ink 1P) in the previous example. Diethylene glycol is the preferred second humectant when 1,3-dimethyl urea is the first humectant.

|  | Ink 2E | Ink 2F Comp. | Ink 2G Comp. | Ink 2H Comp. | Ink 2I Comp. |
| --- | --- | --- | --- | --- | --- |
| Ingredients |  |  |  |  |  |
| Dispersion 1 (as % pigment) | 3.5 | 3.5 | 3.5 | 3.5 | 3.5 |
| 1,3-dimethyl urea | 8.0 | 8.0 | 5.0 | 10.0 | 5.0 |
| Triethylene glycol | 12.0 | — | — | — | — |
| Tetraethylene glycol | — | 12.0 | — | — | — |
| 1,4-butanediol | — | — | 10.0 | — | — |
| Glycerol | — | — | — | 10.0 | — |
| Glycereth-26 | — | — | — | — | 10.0 |
| Surfynol 465 | — | 0.2 | 0.2 | 0.2 | 0.2 |
| Water (to 100%) | Bal. | Bal. | Bal. | Bal. | Bal. |
| Properties |  |  |  |  |  |
| Decap Time (seconds) | 90 | 300 | 30 | 0 | 80 |
| Nozzle Check | Good | Good | Weak | Weak | Good |
| Optical Density | 1.24 | 1.25 | 1.30 | 1.21 | 1.22 |

Example 3

Comparative

Inks in this example demonstrate 1,3-diethyl urea or trimethylene urea (tetrahydro-2-pyrimidinone or propylene urea) in place of the inventive first humectant. Although relatively stable to hydrolysis, as noted herein before, these comparative ureas do not provide the greatly enhanced decap of the inventive first humectant.

|  | Ink 3A | Ink 3B |
| --- | --- | --- |
| Ingredients |  |  |
| Dispersion 1 (as % pigment) | 3.5 | 3.5 |
| 1,3-diethyl urea | 5.0 | — |
| Trimethylene urea | — | 5.0 |
| Diethylene glycol | 10.0 | 10.0 |
| Surfynol 465 | 0.2 | 0.2 |
| Water (to 100%) | Balance | Balance |
| Properties |  |  |
| Decap Time (seconds) | 300 | 100 |
| Nozzle Check | Good | Good |
| Optical Density | 1.35 | 1.14 |

Example 4

Comparative

Inks made with a polymer-dispersed pigment (dispersion 2) do not show the enhanced latency of similar inventive Ink 1H with self-dispersing pigment.

|  | Ink 8A | Ink 8B |
| --- | --- | --- |
| Ingredients |  |  |
| Dispersion 2 (as % pigment) | 3.5 | 3.5 |
| 1,1,3,3-tetramethyl urea | 10.0 | 5.0 |
| Diethylene glycol | 5.0 | 10.0 |
| Surfynol 465 | 0.2 | 0.2 |
| Water (to 100%) | Balance | Balance |
| Properties |  |  |
| Decap Time (seconds) | 60 | 60 |
| Decap Ist Line Loss | 400 | 200 |
| Nozzle Check | Excellent | Excellent |
| Optical Density | 0.82 | 0.84 |

The invention claimed is:

1. An ink-jet ink comprising an aqueous vehicle and a colorant wherein the colorant comprises a self-dispersing pigment and the vehicle comprises water, a first humectant and a second humectant; and wherein said first humectant is selected from the group consisting of 1,3-dimethyl urea, 1,1,3,3-tetramethyl urea and a combination thereof, and is present in the ink in an amount of at least 2 weight percent based on the total weight of ink; and, said second humectant is diethylene glycol.

2. The ink of claim 1 wherein weight ratio of second humectant to first humectant present in the ink is equal to or greater than 0.7.

3. The ink of claim 1 wherein the first humectant is present in an amount of 3-15 weight % based on the total weight of ink.

4. The ink of claim 1 wherein the self-dispersing pigment has been surface modified with anionic dispersibility-imparting groups which anionic dispersibility-imparting groups consist essentially of carboxylate groups.

5. The ink of claim 4 wherein the self-dispersing pigment comprises less than 3.5 micromoles of carboxylate groups per square meter of surface area.

6. The ink of claims 1, 4 or 5 wherein the self-dispersing pigment is a self-dispersing carbon black pigment.

7. The ink according to any of claims 1-5 wherein the first humectant consists of tetramethyl urea.

8. The ink according to any of claims 1-5 wherein the first humectant is 1,3-dimethyl urea.

9. The ink according to claim 8 wherein the second humectant is diethylene glycol.

10. An inkjet ink set comprising at least a cyan, magenta, yellow and black ink wherein the black ink is the ink according to claim 6.

* * * * *